United States Patent
Youngs (10) Patent No.: US 10,911,945 B1
(45) Date of Patent: Feb. 2, 2021

(54) AUTOMATED EUICC SERVICE PROFILE CONFIGURATION IN VIEW OF OPERATIONAL ISSUE WITH RESPECT TO EUICC SERVICE PROFILE

(71) Applicant: Sprint Spectrum L.P., Overland Park, KS (US)

(72) Inventor: Simon Youngs, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/194,617

(22) Filed: Nov. 19, 2018

(51) Int. Cl.
| | |
|---|---|
| H04W 8/30 | (2009.01) |
| H04W 4/60 | (2018.01) |
| H04W 8/18 | (2009.01) |
| H04W 12/06 | (2009.01) |
| H04W 12/04 | (2009.01) |
| H04W 48/18 | (2009.01) |

(52) U.S. Cl.
CPC ............... *H04W 8/30* (2013.01); *H04W 4/60* (2018.02); *H04W 8/183* (2013.01); *H04W 12/0401* (2019.01); *H04W 12/06* (2013.01); *H04W 48/18* (2013.01)

(58) Field of Classification Search
CPC ... H04W 12/0401; H04W 12/06; H04W 8/18; H04W 8/183; H04W 8/30; H04W 48/18; H04W 4/60; H04L 63/0853
See application file for complete search history.

(56) References Cited

U.S. PATENT DOCUMENTS

| | | | | |
|---|---|---|---|---|
| 6,219,702 B1 * | 4/2001 | Ikehara | ................... | G06Q 30/02 370/270 |
| 7,139,570 B2 * | 11/2006 | Elkarat | .................... | H04W 8/06 455/432.3 |
| 9,020,479 B1 * | 4/2015 | Somayajula | .......... | H04W 48/18 455/418 |
| 9,628,981 B2 * | 4/2017 | Park | .................... | H04L 63/0869 |
| 9,942,094 B1 * | 4/2018 | Kovacevic | ........ | H04W 12/0023 |
| 10,004,021 B2 * | 6/2018 | Pawar | .................... | H04W 36/32 |
| 10,111,086 B2 * | 10/2018 | Hjelt | ...................... | H04M 15/49 |
| 10,334,427 B2 * | 6/2019 | Yang | ...................... | H04W 12/06 |
| 10,334,428 B1 * | 6/2019 | Chen | ..................... | H04W 8/205 |
| 10,567,952 B1 * | 2/2020 | Finger | ................... | H04W 8/183 |

(Continued)

*Primary Examiner* — Jenee Holland (57) ABSTRACT

A mechanism to help avoid operational failures with respect to mobile network operator (MNO) service profiles on embedded universal integrated circuit cards (eUICCs). A profile management system or other entity detects operational failures associated with MNO service profiles and responsively provides new MNO service profiles selected to help avoid recurrence of the operational failures. For instance, the profile management system could detect an operational failure that occurred on a given mobile device and could responsively provide a replacement MNO service profile for installation on that device. Further, the profile management system could detect a trend where such failures occur with respect to MNO service profiles from a first source (e.g., first vendor) on eUICCs from a second source (e.g., a second vendor) and could responsively take action to help avoid such a combination of MNO service profile and eUICC, so as to help avoid recurrence of the operational failures.

20 Claims, 5 Drawing Sheets

(56) References Cited

U.S. PATENT DOCUMENTS

| | | | |
|---|---|---|---|
| 2005/0070321 A1* | 3/2005 | Weigele | H04W 8/265 455/517 |
| 2006/0089172 A1* | 4/2006 | Kim | H04M 1/2745 455/558 |
| 2007/0184858 A1* | 8/2007 | Landschaft | H04W 8/183 455/466 |
| 2007/0191057 A1* | 8/2007 | Kamada | H04M 1/274516 455/558 |
| 2009/0215447 A1* | 8/2009 | Catalano | H04W 48/18 455/432.1 |
| 2012/0144189 A1* | 6/2012 | Zhong | H04L 63/0853 713/155 |
| 2012/0202456 A1* | 8/2012 | Ferro Morado | H04M 15/00 455/406 |
| 2012/0208597 A1* | 8/2012 | Billman | H04W 12/02 455/558 |
| 2012/0263298 A1* | 10/2012 | Suh | H04W 12/04 380/255 |
| 2013/0017862 A1* | 1/2013 | Lee | H04M 3/42238 455/558 |
| 2013/0031375 A1* | 1/2013 | Lin | G06F 21/76 713/192 |
| 2013/0219483 A1* | 8/2013 | Cho | H04L 63/145 726/13 |
| 2013/0227646 A1* | 8/2013 | Haggerty | H04L 63/06 726/3 |
| 2013/0231087 A1* | 9/2013 | O'Leary | H04W 12/0608 455/411 |
| 2013/0331063 A1* | 12/2013 | Cormier | H04L 63/0272 455/411 |
| 2013/0339305 A1* | 12/2013 | Kim | G06F 16/27 707/652 |
| 2014/0004827 A1* | 1/2014 | O'Leary | H04W 8/22 455/411 |
| 2014/0031012 A1* | 1/2014 | Park | H04W 12/06 455/411 |
| 2014/0045488 A1* | 2/2014 | Cheng | H04W 76/18 455/423 |
| 2014/0165155 A1* | 6/2014 | Zhang | H04L 12/1407 726/4 |
| 2014/0172712 A1* | 6/2014 | Petersen | G06Q 10/00 705/44 |
| 2014/0228071 A1* | 8/2014 | Villarrubia Grande | H04M 1/72519 455/552.1 |
| 2015/0072681 A1* | 3/2015 | Allmann | B60R 16/0231 455/435.1 |
| 2015/0163056 A1* | 6/2015 | Nix | H04W 12/0023 380/46 |
| 2015/0271662 A1* | 9/2015 | Lhamon | H04W 8/183 370/329 |
| 2015/0281198 A1* | 10/2015 | Lee | H04W 12/0608 726/7 |
| 2015/0281964 A1* | 10/2015 | Seo | H04L 63/102 726/9 |
| 2015/0303966 A1* | 10/2015 | Lee | H04W 4/12 455/466 |
| 2015/0350877 A1* | 12/2015 | Li | H04W 8/183 455/558 |
| 2015/0350881 A1* | 12/2015 | Weiss | H04W 12/04 455/558 |
| 2016/0020803 A1* | 1/2016 | Cha | H04W 8/205 455/558 |
| 2016/0057725 A1* | 2/2016 | Suh | G06Q 50/30 455/435.1 |
| 2016/0088464 A1* | 3/2016 | Hans | H04M 3/42229 455/558 |
| 2016/0150400 A1* | 5/2016 | Cha | H04W 8/245 455/418 |
| 2016/0164933 A1* | 6/2016 | Kafle | H04W 76/10 709/219 |
| 2016/0174065 A1* | 6/2016 | Li | H04W 4/60 455/419 |
| 2016/0183081 A1* | 6/2016 | Flores Cuadrado | H04W 4/24 455/558 |
| 2016/0249214 A1* | 8/2016 | Li | H04W 4/70 |
| 2016/0269891 A1* | 9/2016 | Chen | H04W 76/18 |
| 2016/0283216 A1* | 9/2016 | Gao | H04W 12/004 |
| 2016/0283311 A1* | 9/2016 | Joshi | G06F 11/0766 |
| 2016/0302061 A1* | 10/2016 | Park | H04W 12/04 |
| 2016/0302070 A1* | 10/2016 | Yang | H04W 12/00401 |
| 2016/0316356 A1* | 10/2016 | Li | H04W 8/205 |
| 2016/0316372 A1* | 10/2016 | Daksiewicz | H04W 4/50 |
| 2017/0013451 A1* | 1/2017 | Miao | H04W 8/18 |
| 2017/0064552 A1* | 3/2017 | Park | H04L 63/0869 |
| 2017/0155507 A1* | 6/2017 | Park | H04W 12/04 |
| 2017/0156051 A1* | 6/2017 | Park | H04W 4/80 |
| 2017/0170856 A1* | 6/2017 | Shen | H04W 12/0023 |
| 2017/0171742 A1* | 6/2017 | Yang | H04W 8/245 |
| 2017/0214423 A1* | 7/2017 | Park | H04M 1/72522 |
| 2017/0222991 A1* | 8/2017 | Yang | H04L 9/3247 |
| 2017/0244837 A1* | 8/2017 | Kim | H04M 3/54 |
| 2017/0272944 A1* | 9/2017 | Link, II | H04W 12/0609 |
| 2017/0272945 A1* | 9/2017 | Link, II | H04W 4/70 |
| 2017/0289788 A1* | 10/2017 | Lalwaney | H04L 41/0803 |
| 2017/0325084 A1* | 11/2017 | Larignon | H04W 12/00405 |
| 2017/0332274 A1* | 11/2017 | Link, II | H04W 76/11 |
| 2017/0332312 A1* | 11/2017 | Jung | H04W 12/06 |
| 2017/0338954 A1* | 11/2017 | Yang | H04W 12/04 |
| 2018/0060199 A1* | 3/2018 | Li | G06F 8/61 |
| 2018/0109945 A1* | 4/2018 | Kweon | H04W 8/18 |
| 2018/0213078 A1* | 7/2018 | Visuri | H04M 1/72552 |
| 2018/0294949 A1* | 10/2018 | Yang | H04L 67/306 |
| 2018/0295500 A1* | 10/2018 | Yang | H04W 8/183 |
| 2018/0309868 A1* | 10/2018 | Karimli | G06F 21/44 |
| 2018/0373304 A1* | 12/2018 | Davis | H01H 9/56 |
| 2019/0028881 A1* | 1/2019 | Namiranian | H04W 4/70 |
| 2019/0075448 A1* | 3/2019 | Prakash | H04M 1/72561 |
| 2019/0097794 A1* | 3/2019 | Nix | H04L 9/085 |
| 2019/0098488 A1* | 3/2019 | Syed | H04L 67/306 |
| 2019/0104401 A1* | 4/2019 | Park | H04W 8/20 |
| 2019/0174299 A1* | 6/2019 | Ullah | H04L 63/0876 |
| 2019/0181901 A1* | 6/2019 | Namiranian | H04L 63/08 |
| 2019/0253563 A1* | 8/2019 | Ullah | H04M 15/705 |
| 2019/0268755 A1* | 8/2019 | Namiranian | H04W 8/183 |
| 2019/0289454 A1* | 9/2019 | Inoue | H04L 9/0825 |
| 2019/0313241 A1* | 10/2019 | Ahmed | H04W 12/0609 |
| 2019/0342750 A1* | 11/2019 | Shanker | H04W 8/205 |
| 2019/0373448 A1* | 12/2019 | Gao | H04W 8/20 |
| 2020/0008049 A1* | 1/2020 | Namiranian | H04W 12/001 |
| 2020/0021973 A1* | 1/2020 | Anslot | H04W 8/265 |
| 2020/0045544 A1* | 2/2020 | Yu | H04L 9/3247 |
| 2020/0092711 A1* | 3/2020 | Chen | H04B 1/3816 |
| 2020/0112854 A1* | 4/2020 | Namiranian | G06K 7/1417 |
| 2020/0137558 A1* | 4/2020 | Chaugule | H04W 8/24 |
| 2020/0220983 A1* | 7/2020 | Hu | H04W 4/90 |

* cited by examiner

AUTOMATED EUICC SERVICE PROFILE CONFIGURATION IN VIEW OF OPERATIONAL ISSUE WITH RESPECT TO EUICC SERVICE PROFILE

BACKGROUND

Mobile communication devices, such as cell phones, tablet computers, and other devices, are typically configured to use universal integrated circuit cards (UICCs), each of which includes a microprocessor and storage for holding a mobile network operator (MNO) service/subscription profile.

Traditionally, these UICCs were configured to be removably inserted into a UICC-bay of a mobile device and would store a single MNO profile in read only memory (ROM), enabling the mobile device to be served by a single associated MNO. Such UICCs, with access subscription data, are commonly known as SIMs (Subscriber Identity Modules, or "Subscription" Identity Modules).

Recently, however, the industry has introduced an embedded version of the UICC referred to as an eUICC or eSIM, which can be permanently soldered to the system board of the mobile device at the time of manufacture. Advantageously, the eSIM allows MNO profiles to be downloaded over the air and enabled when required, thereby enabling a change from one MNO profile to another (e.g., through a device user interface) without the need to physically swap the SIM. These eSIMs can be relatively inexpensive to manufacture, and with their small size, may be optimal for various uses, including for instance in the growing Internet of Things (IoT) market.

Overview

An eSIM includes a processing unit (e.g., microprocessor) and storage for holding data defining program instructions, profiles, and other reference information. The program instructions define an operating system as well as other program modules for managing storage and use of profiles.

Each profile stored on the eSIM comprises data and/or applets that a profile handler (e.g., local profile assistant (LPA)) or other eSIM-associated logic could interpret and apply. The contents of a profile that are used by the radio modem in the device are of the same form as those traditionally contained within a SIM.

A representative profile is specific to a given MNO and a given service subscription for the mobile device with that MNO. As such, the profile contains data and application logic that enables the mobile device to be served by that MNO in accordance with a service subscription. The profile could contain one or more network access applications (providing authorization to access the MNO's network) and associated network access data (data such as an international mobile equipment identity (IMEI) and one or more security keys and specifications of security-algorithms required for authenticating to the MNO's network), roaming data such as a preferred roaming list (PRL), and various MNO applications and/or third party applications, as well as a profile ID.

When a user (e.g., individual or enterprise) interacts with an MNO to establish a service subscription for the device, the MNO could use or interwork with a subscription manager data preparation (SM-DP+) to generate an MNO profile for the device. Through interaction with the device (e.g., upon user entry into the device of a matching code established for the new MNO profile), a local profile discovery component of the device's eSIM could then engage in communication with a subscription manager discovery service (SM-DS), through WiFi or in accordance with a preloaded provisioning profile, to download the new MNO profile from the SM-DP+. And the eSIM could store and enable the obtained MNO profile for use.

When an MNO profile is enabled on a mobile device's eSIM, the eSIM applies that profile to allow the mobile device to be served by the associated MNO in accordance with the associated service subscription. For instance, when the mobile device enters into coverage of the MNO's network, the eSIM could engage in communication with an MNO authentication center to authenticate the eSIM and thus the mobile device for service. And other logic in or associated with the profile could be applied to limit or define the scope of allowed service or other associated functions.

Unfortunately, however, technical problems can occur when an eSIM attempts to operate in accordance with certain MNO profiles. These problems could arise as a result of incompatibility between the profile and the eSIM, perhaps as a result of different vendors producing the profile and the eSIM (e.g., the eSIM operating system), and/or for other reasons. Without limitation, examples of such problems include failure MNO authentication and in some cases even failure to load and/or install the profile on the eSIM in the first place.

Disclosed are methods and systems to help address such issues. In accordance with the disclosure, operational failures associated with MNO profiles could be detected and, in response, new MNO profiles selected to help avoid recurrence of the operational failures could be automatically provided or queued for installation on one or more eSIMs.

In practice, at issue could be an operational failure with respect to a particular service profile on a particular eSIM, perhaps as a result of incompatibility between the service profile and the eSIM. In that situation, a computing system could detect the operational failure and could respond by automatically replacing the service profile in an effort to avoid a recurrence of the operational failure. For instance, upon detecting such an operational failure, the computing system might learn that the service profile is sourced from a vendor different than the vendor of the eSIM, and to help avoid a recurrence of the operational failure, the computing system might then provide a replacement service profile selected based on the replacement service profile being sourced from the same vendor as the eSIM.

Alternatively or additionally, at issue may be more generally that operational failures tend to occur when service profiles sourced from a first vendor are provided for use on eSIMs sourced from a second, different vendor. In practice, a computing system could detect this situation, based on reports of multiple such operational failures. And in response, the computing system could take action to help ensure that when an eSIM is sourced from the second vendor, the eSIM will be provisioned with a service profile also sourced from the second vendor rather than with a service profile sourced from the first vendor, to help ensure operational compatibility between the eSIM and the service profile.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example mobile device 12 operable in accordance with the present disclosure. It will be understood, however, that numerous variations from the details disclosed in this figure and elsewhere herein are possible. For instance, elements, arrangements, and functions may be added, removed, combined, distributed, reordered, or otherwise modified. In addition, it will be understood that functions described as being performed by one or more entities may be implemented in various ways, such as by a processor executing software instructions for instance.

Figure 1:
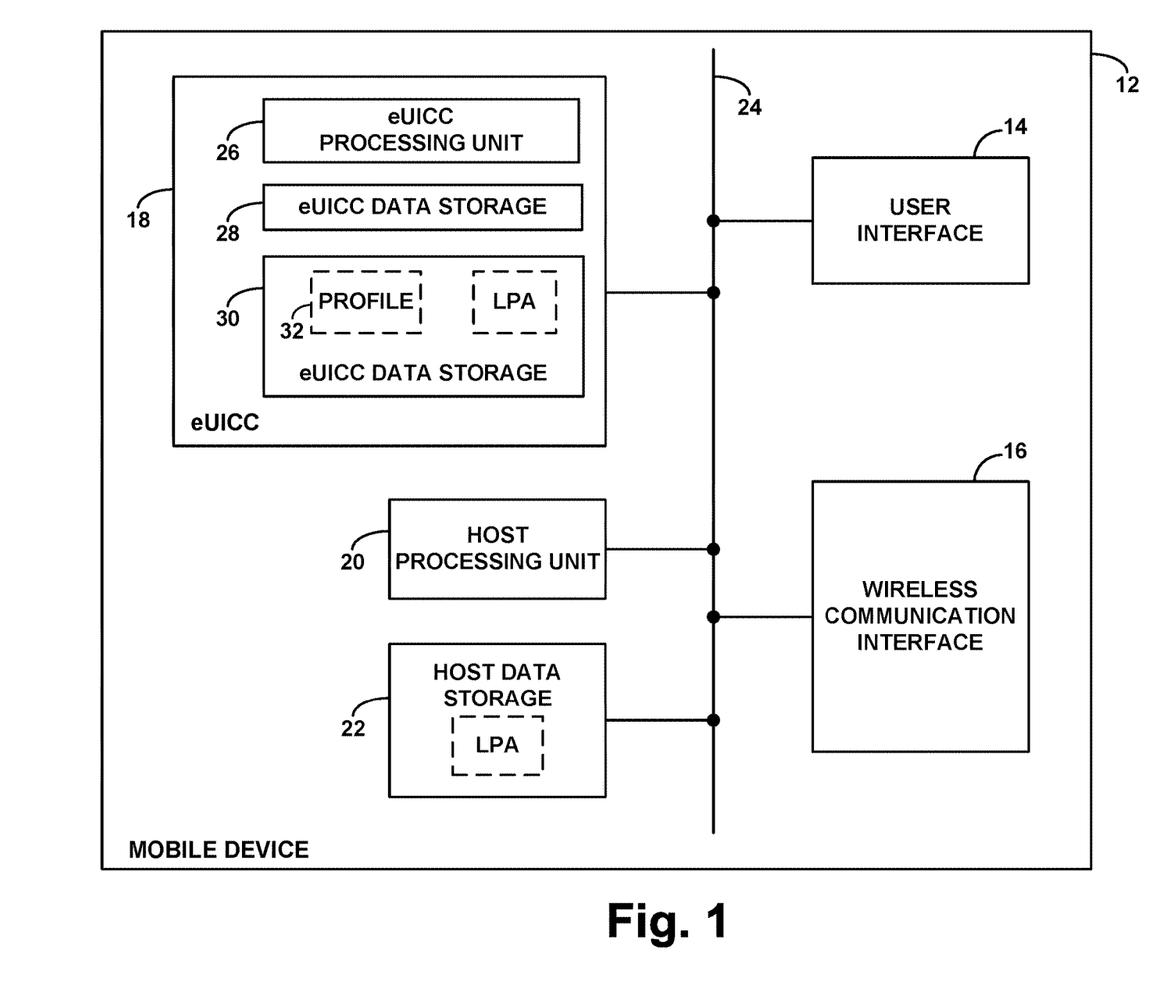
FIG. 1 is a simplified block diagram of an example mobile device operable in accordance with the present disclosure.

The example mobile device 12 could take any of the forms noted above, among other possibilities, and could be owned or operated by a user who subscribes to service of an MNO (a mobile network operator, or a mobile virtual network operator), such as a cellular wireless service provider for instance.

As shown, the mobile device 12 includes a wireless communication interface 14, a user interface 16, a host processing unit 18, host data storage 20, and an eUICC (e.g., eSIM) 22, any or all of which could be communicatively linked together by a system bus or other mechanism 24.

The wireless communication interface 14 could comprise one or more wireless communication modules to enable device 12 to engage in wireless communication according to one or more air interface protocols. For instance, the wireless communication interface could include one or more wireless wide area network (WWAN) communication modules configured to support communication according to one or more cellular wireless protocols such as Code Division Multiple Access (CDMA), Global System for Mobile Communication (GSM), Long Term Evolution (LTE), 5G New-Radio (5G NR), and/or others. Further, the wireless communication interface could include one or more wireless local area network (WLAN) communication modules to facilitate communication according to one or more WLAN protocols such as WIFI, BLUETOOTH, ZIGBEE, and/or others.

The user interface 16 could then comprise one or more components configured to facilitate communication with a user of the device if applicable. For instance, the user interface could include output components, such as a display and audio output, configured to provide output to a user, and input components, such as a touch interface and microphone, configured to receive input from a user.

The host processing unit 18 could comprise one or more general purpose processors (e.g., microprocessors) and/or one or more dedicated or specialized processing units. And the host data storage 20 could comprise one or more volatile and/or non-volatile memory or other non-transitory machine-readable media, such as magnetic, optical, or flash storage, which could hold program logic executable by the host processing unit 18 as well as reference data for reference by the host processing unit 28, to facilitate carrying out various mobile device operations.

The eUICC 22 could then comprise a UICC mounted on a system board of the mobile device and could comprise an eUICC communication interface 26, an eUICC processing unit 28, and eUICC data storage 30, which could be integrated and/or communicatively linked together on an integrated circuit card or chip mounted on a system board of the mobile device or otherwise embedded in the mobile device.

The eUICC communication interface 26 could include one or more physical connections (e.g. pins) for interfacing with the host mobile device 12, so as to support communication between the eUICC 26 and the mobile device 12. The eUICC processing unit 28 could comprise one or more general purpose or specialized processors, which could be programmed or otherwise configured to carry out various disclosed eUICC operations. And the eUICC data storage 30 could comprise one or more volatile and/or non-volatile memory or other non-transitory machine-readable media, which could hold program logic executable by the eUICC processing unit 28 as well as reference data for reference by the eUICC processing unit 28, to facilitate carrying out various eUICC operations.

The eUICC data storage 30 of the eUICC is configured to hold profiles such as a representative MNO profile 32. For instance, the eUICC data storage 30 could have a dedicated, secure storage space for holding these profiles and/or could be generally configured for storage and could thus facilitate storage of these profiles. In practice, the MNO profile 32 could be specific to a particular MNO and could define data for a service subscription with that MNO. As noted above, for instance, the profile could contain one or more network access applications and associated network access data, various MNO applications and/or third party applications, roaming data, and a profile ID, among other possibilities.

The representative mobile device also includes an LPA, which could be configured to manage downloading and installation of MNO profiles on the eUICC 18. As shown in FIG. 1, the LPA could be provided on the eUICC itself, such as in the form of program logic stored in the eUICC data storage 30 and executable by the eUICC processing unit 26. Alternatively, the LPA could be provided external to the eUICC, such as in the form of program logic stored in the host data storage 22 and executable by the host processing unit 20. Other arrangements are possible as well.

In practice, the mobile device 12 could be manufactured by a particular original equipment manufacturer (OEM), and the OEM could select a source for the eUICC to embed in the mobile device. The source of the eUICC could be the OEM itself or could be any of various third-party eUICC manufacturers. The mobile-device OEM could thus produce or obtain the eUICC and embed the eUICC in the mobile device, soldering the eUICC to a system board of the mobile device for instance. Each such eUICC could have a unique eUICC identifier (EID), such as 32-digit value, which could include or map to an identity of the eUICC source. Thus, provided with the EID of the eUICC, a computing system could determine the source of the eUICC.

Further, the LPA could also be provided by the same source as the eUICC. This would be the case by necessity if the LPA is provided on the eUICC itself. Alternatively, the mobile-device OEM could work with the eUICC vendor to obtain and implement on the mobile device an LPA configured to interwork with the eUICC. For instance, the LPA could be provided as an application that runs on an operating system of the mobile device. As such, in some situations, a provider of the operating system of the mobile device may impose certain restrictions on functionality of the LPA, such as policies related to the LPA's downloading and installing of MNO profiles or the like.

Figure 2:
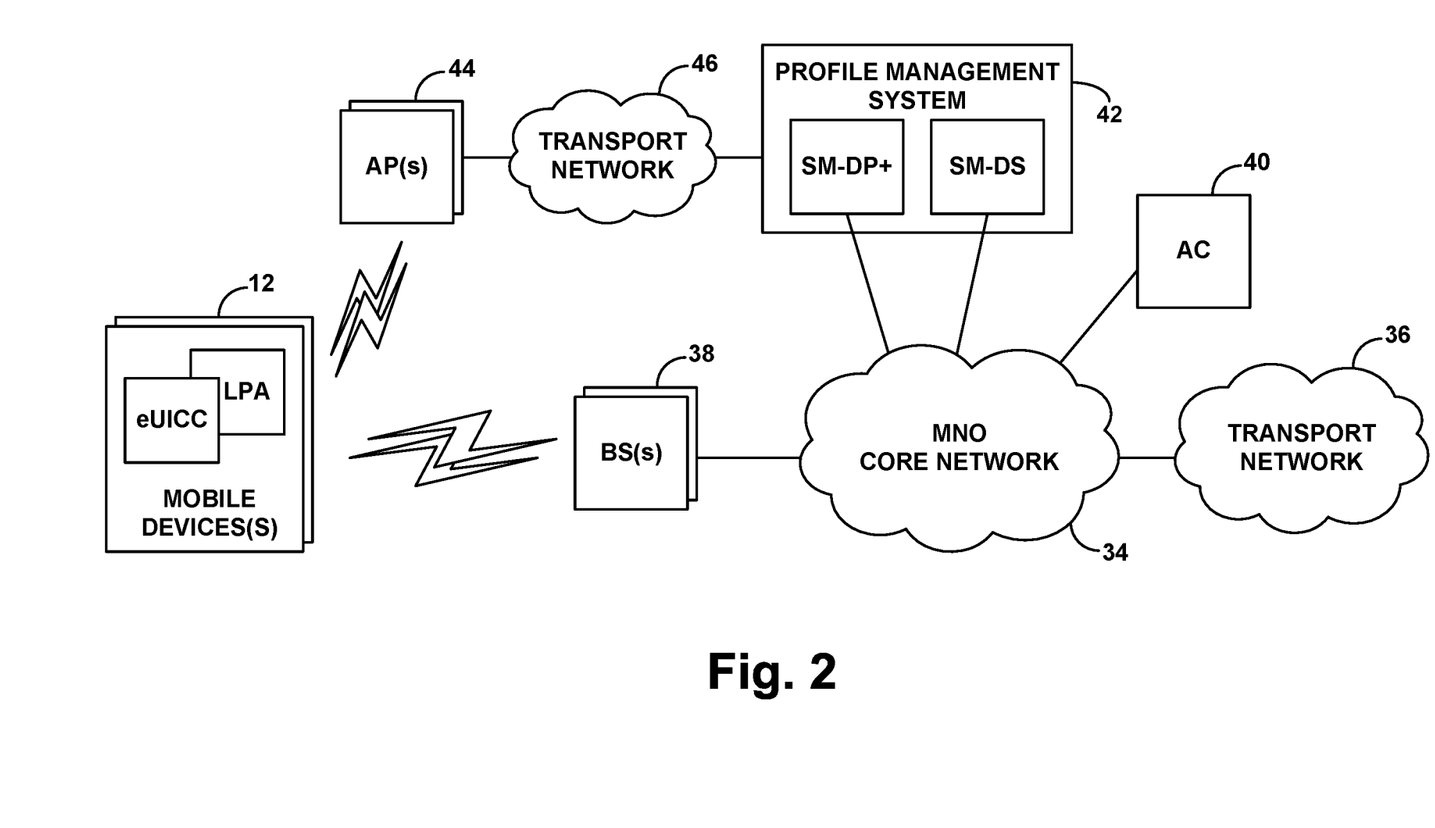
FIG. 2 is a simplified block diagram of an example network arrangement in which features of the disclosure could be implemented.

FIG. 2 is next a simplified block diagram of an example network arrangement in which features of the present disclosure can be implemented. FIG. 2 depicts an MNO core network 34, which could include various gateways and controllers (not shown) to facilitate providing mobile devices with connectivity with one or more transport networks 36 such as the Internet or the Public Switched Telephone Network (PSTN) for instance. Shown sitting as nodes on the MNO core network 34 are one or more base stations 38, an authentication center 40, and a profile management system 42.

The base stations 38 could comprise macro base stations, small cell base stations, relay base stations, and/or other types of cellular base stations, configured to provide cellular coverage in which to serve mobile devices in accordance with one or more cellular wireless protocols such as those noted above for instance. And the authentication center 40, which could be provided in connection with a home location register (HLR) or home subscriber server (HSS), could be configured to carry out authentication of mobile devices seeking to be served by the MNO.

The profile management system 40 could then comprise one or more servers, such as an SM-DP+ and an SM-DS, cooperatively configured to establish, store, and deliver MNO profiles to mobile devices for installation on eUICCs in the mobile devices. Further, the profile management system 42 could be configured in accordance with the present disclosure to determine and track when operational failures occur with respect to MNO profiles and to take action to help facilitate installation of suitable MNO profiles on eUICCs to help avoid recurrence of the operational failures.

FIG. 2 further depicts a number of mobile devices 12 configured to communicate with the base stations 38 in accordance with one or more applicable cellular wireless protocols. These mobile devices could be configured as discussed above, and each mobile device each could thus include an eUICC with an integrated or associated LPA, among other components. The mobile devices could thus engage in communication with the profile management system 42 via the base stations 38 and the MNO's core network 34. In practice, the mobile devices might initially include special provisioning profiles that allow the mobile devices to gain limited cellular access to be able to communicate with the profile management system so as to facilitate downloading and enabling of an MNO service profile in accordance with a service subscription.

As further shown, the mobile devices 12 might also be configured to communicate with the profile management system 42 through one or more WLAN connections. For instance, the mobile devices could be configured to communicate with WLAN access points (e.g., 802.11 WiFi access points) 44, which facilitate communication over a transport network 46 such as the Internet with the profile management system 42. In an example implementation, the mobile devices might communicate via the access points 44 with an edge server of the MNO's core network 34 and, via the edge server and the core network, with the profile management system 42. Other arrangements are possible as well.

Figure 3:
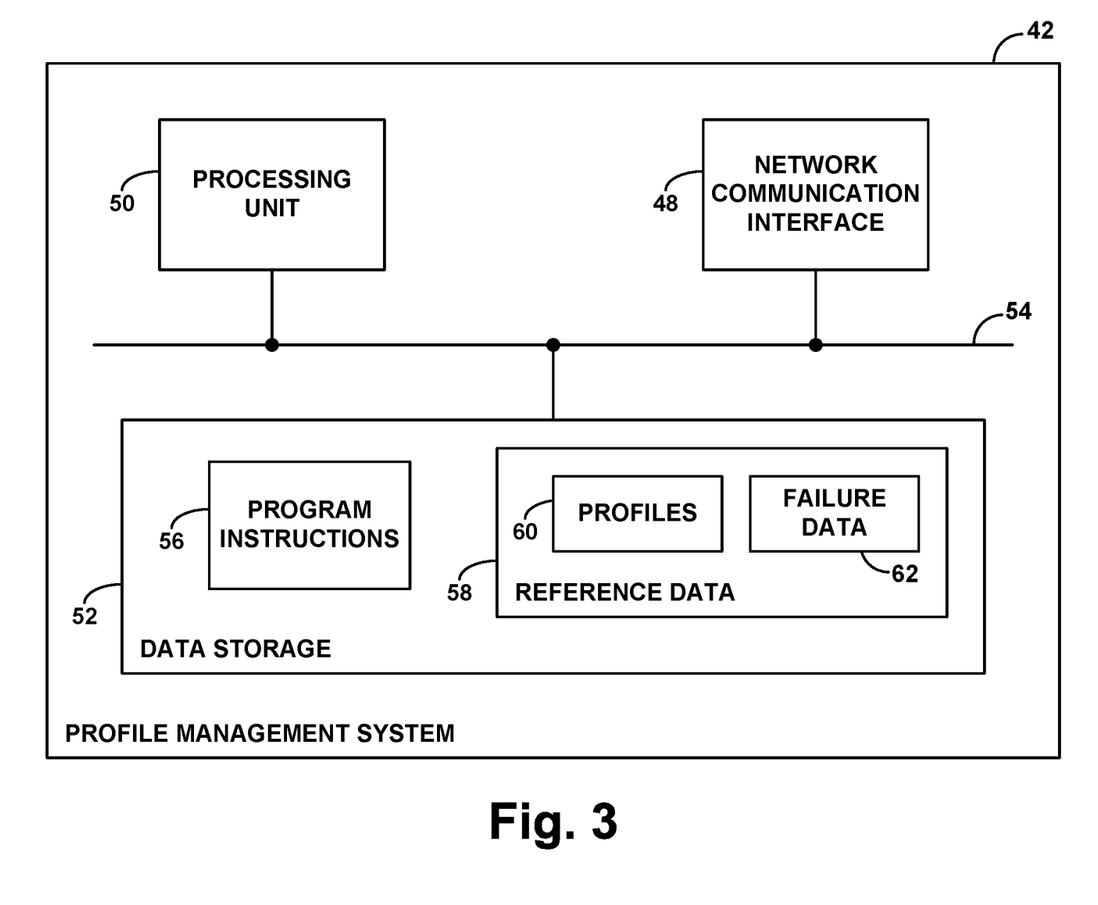
FIG. 3 is a simplified block diagram of an example profile management system operable in accordance with the disclosure.

FIG. 3 is next a simplified block diagram depicting components that could be included in an example of the profile management system 42 of the MNO, such as a profile management system operated by or for the MNO. As shown, the example profile management system 42 includes a network communication interface 48, a processing unit 50, and data storage 52, which could be integrated or communicatively linked together by a system bus, network, or other connection mechanism 54.

The network communication interface 46 could include one or more modules configured to facilitate wired and/or wireless communication on the core network 34 and/or through other channels, such as to facilitate communication with mobile devices and other entities. The processing unit 50 could include one or more general purpose processors or specialized processors. And the data storage could include one or more volatile and/or non-volatile memory or other non-transitory machine-readable media, which could hold program instructions 56 executable by the processing unit 50 to carry out various profile management system operations as well reference data 58 useable by the processing unit 50 to facilitate carrying out those operations.

As shown, the reference data in an example implementation includes service profiles 60. These service profiles 60 could include generic MNO profiles that could be personalized to be specific to mobile devices' service subscriptions with the MNO. Further, the service profiles could include the resulting personalized MNO profiles or other MNO profiles that are specific to mobile devices' service subscriptions, whether or not based on generic MNO profiles.

In practice, these MNO profiles could come from various profile vendors or other sources, such as from third-party profile vendors or from the MNO itself. For instance, the MNO could arrange with profile sources to have the profile sources generate and provide the MNO with MNO profiles that are structured in compliance with various industry standards, and the MNO could store those MNO profiles in the profile management system 42, such as in association with the SM-DP+. The sources of the MNO profiles may or may not be the same as the sources of the eUICCs discussed above.

As noted above, each profile could comprise a set of data that contains or is structured to contain various profile components as discussed above, such as network access applications and associated network access data, MNO applications, third party applications, and/or roaming data, for instance. Further, each profile could have a unique profile ID (ICC-ID), such as a 20-digit value, which could include or map to an identity of the profile source. In addition, each profile could include a specification of the size (e.g., file size) of the profile, for use to determine whether the profile can be loaded onto an eUICC, based on available eUICC storage capacity.

In a representative implementation, when a user initially enters into a service agreement with the MNO to have the MNO provide service for the user's mobile device, the MNO may work with the SM-DP+ to establish an MNO profile to be delivered to and installed on the eUICC of the mobile device.

For instance, the MNO might provide the SM-DP+ with the mobile device's IMEI and other service-subscription related information. And the SM-DP+ may then personalize a generic MNO profile to be specific to the mobile device's subscription or could otherwise obtain for the mobile device an MNO profile specific to the mobile device's subscription. Further, the MNO may register the established profile in the MNO's backend systems, including recording the profile's network access data at an MNO authentication center or associated HLR or HSS, to facilitate later MNO authentication of the mobile device.

The MNO could then provide the user or the mobile device with information indicating how to download and install the established profile on the mobile device to facilitate activating service with the MNO. For example, the MNO could provide the user with a code or link that points to or facilitates accessing the profile at a particular SM-DP+ address or could transmit such information to the device if a suitable communication channel exists. Further, the MNO could provide the user or device with instructions to activate service, which could involve causing the LPA to transmit to the SM-DP+a request for the indicated profile, to receive the established profile in response from the SM-DP+, to store the received profile on the eUICC, and to set the profile as the active profile on the eUICC.

When an LPA requests a profile, the SM-DP+ could identify the MNO profile that is to be delivered to the mobile device and could inform the LPA what the size (e.g., file size) of the profile is, to enable the LPA to determine whether sufficient eUICC storage capacity exists to store the profile. Assuming sufficient eUICC storage capacity exists, the LPA could then receive, store, and activate the MNO profile. Whereas, if insufficient eUICC storage capacity exists, the LPA could cancel the profile request and/or take other action.

Once the profile has been so installed on the mobile device's eUICC, the device could then enter into coverage of the MNO's network and receive wireless communication service from the MNO.

When the mobile device initially enters into sufficiently strong coverage of the MNO's network, the device could engage in the signaling with a base station to establish a radio-link-layer connection with the base station, and the device could engage in signaling via the base station with a core-network controller and in turn with an authentication center to enable the MNO to authenticate the device as a condition for the MNO serving the device.

In a representative implementation, as noted above, the MNO profile installed on the device's eUICC could specify network access data that will facilitate the authentication process. For instance, the network access data could include a secret security key, such as an A-key, and a specification of a security algorithm (e.g., AES, 3DES, LAS, RSA, MD5, etc.) that is to be applied to compute an authentication result based on the secret key and a dynamically generated random value or the like.

To facilitate authentication, the device's eUICC could read the MNO profile to determine the security algorithm and secret key and could receive from the MNO authentication center the random value, and the eUICC could apply the indicated security algorithm to compute an authentication result and send the computed authentication result to the authentication center. Further, the authentication center could look up the device's network access data based on the device's IMEI and could thus apply the same indicated security algorithm to the same to the same secret key to likewise produce an authentication result. And at issue could then be whether the authentication center's computed authentication result matches the authentication result provided by the eUICC. If the authentication results match, then the authentication center could conclude that authentication succeeded, and the MNO may then proceed to serve the device. Whereas, if the authentication results do not match, then the authentication center could conclude that authentication failed, and the MNO may decline to serve the device.

As noted above, various operational failures could occur with respect to an MNO profile provided for use on a given eUICC, perhaps as a result of incompatibility between the eUICC and the MNO profile, or for other reasons. In particular, some such operational failures may tend to occur when MNO profiles that are from one source (e.g., a first vendor) are provided for use by eUICCs from another, different source (e.g., a second vendor). In practice, the eUICCs from one source might misinterpret, misapply, or otherwise misuse data on MNO profiles from another source, which could lead operational failures.

One such operational failure could be authentication failure in a situation where authentication should succeed. This could happen for various reasons.

As one example, certain MNO profiles (e.g., those from a particular source) might designate use of a particular security algorithm. But certain eUICCs (e.g., those from a different source) might be configured with erroneous logic for carrying out that particular security algorithm. When such an MNO profile is installed on such an eUICC, the eUICC may therefore compute an authentication result that does not match the authentication result computed by the MNO's authentication center, and so authentication would fail.

As another example, while a security key is supposed to be a certain length in digits, certain MNO profiles (e.g., those from a particular source) might include an extra digit. Although the MNO's authentication center might be configured to remove that extra digit before or while applying the security algorithm, certain eUICCs (e.g. those from a different source) might not be so configured. Consequently, if such a profile is installed on such an eUICC, the eUICC may likewise compute an authentication result that does not match the authentication result computed by the authentication center, and so authentication would fail.

Another such operational failure could be failure to install the profile onto the eUICC in the first place. This could also happen for various reasons.

As one example, certain MNO profiles (e.g., those from a particular source) might include profile policy rules (PPRs), such as policies disallowing deactivation or deletion of the profile, among other possibilities. But certain eUICCs (e.g., those from a different source), per their associated LPAs, might be configured to not permit installation of profiles that include such PPRs or other such profile components. As a result, an SM-DP+ provides such an MNO profile for installation on such an eUICC, the associated LPA may reject the installation outright, and so profile installation would fail.

As another example, certain MNO profiles (e.g., those from a particular source) might specify their file size in a manner that certain eUICCs (e.g., those from a different source) do not correctly interpret. For instance, some MNO profiles might specify their file size in kilobytes, but some eUICCs might interpret those specifications as being in bytes. Given this, an LPA may determine that such an MNO profile is small enough to fit within available eUICC storage capacity when in fact insufficient eUICC storage capacity exists. And after the LPA receives the MNO profile, the LPA may reject the profile based on insufficient storage capacity, likewise resulting in installation failure.

In accordance with the present disclosure, the profile management system 42 (or another computing system) could detect when one or more such operational failures occur and could responsively work to configure one or more eUICCs with MNO profiles to help avoid a recurrence of the operational failure(s).

In practice, the profile management system could learn about operational failures such as those noted above by receiving reports of the operational failures from the involved eUICCs, LPAs, and/or other entities. Further, for each such operational failure, the profile management system could determine the source of the associated eUICC, the associated source of the associated MNO profile, and the type of failure that occurred. And the profile management system could track this data as failure data 62.

By way of example, when MNO authentication failures or installation failures occur, the involved eUICCs and/or LPAs could transmit reports of the failures to the profile management system through a WLAN communication interface or other available communication channel. And for each such operational failure, the report could specify the EID of the eUICC, the IMEI of the mobile device, the ICC-ID of the MNO profile, and a cause code or other explanation of the particular operational failure that occurred. Given the EID and ICC-ID, the profile management system could determine the sources of the involved eUICC and the MNO profile, and the profile management system could store a record that a particular operational failure occurred with respect to an eUICC from a particular source and an MNO profile from a particular source.

The profile management system could then take action in response learning of or otherwise detecting one or more such operational failures.

By way of example, in response to learning of an operational failure with respect to a given MNO profile on a given eUICC, the profile management system could provide a replacement MNO profile for use on the eUICC. The replacement MNO profile would be for the same service subscription with the same MNO, but would differ from the MNO profile that was involved in the operational failure.

For instance, if the operational failure was an authentication failure, the replacement MNO profile could be configured to specify different network access data, such as a different security algorithm and/or a different security key, and these changes could be registered in the MNO's back-end systems to facilitate authentication of the mobile device. Whereas, if the operational failure was an installation failure due to inclusion in the profile of an impermissible PPR, the replacement MNO profile could be a profile that does not include such a PPR. And likewise, if the operational failure was an installation failure due to insufficient storage capacity, the replacement MNO profile could be a skinnier profile, such as one that does not include roaming data or one or more other components.

Further, or alternatively, the profile management system could determine, based on the report of the operational failure, that the eUICC at issue is from a different source than the MNO profile at issue, and the profile management system could seek to avoid a recurrence of the operational failure by providing a replacement MNO profile that is selected based on it being from the same source as the eUICC. For instance, the profile management system could select a generic profile provided by the same source as the eUICC and could personalize that selected profile to be for the mobile device's service subscription with the MNO.

The profile management system could deliver the replacement MNO profile to the eUICC in various ways. For example, if the profile management system received a report of the operational failure from the associated LPA, the profile management system might transmit the replacement MNO profile to the LPA in or as a response to that report. As another example, the profile management system may queue the replacement MNO profile for delivery to the mobile device and, through a procedure such as that described above as used in initial device activation, the profile management system could then transmit that queued profile to the LPA for installation on the device's eUICC.

As further discussed above, the profile management system could also detect a trend in operational failures occurring with respect to particular combinations of eUICC source and MNO-profile source, and the profile management system could take action in view of that detected trend.

For instance, the profile management system could roll up the data that it has recorded regarding various operational failures to establish counts or other statistical measures related to the extent to which operational failures tend to occur for particular combinations of eUICC source and MNO-profile source. Based on these measures, the profile management system could then programmatically conclude that when an MNO profile from a first source is provided for use on an eUICC from a second, different source, an operational failure will likely occur. In an example implementation, once the profile management system has detected a threshold great number of instances of operational failures with a combination of particular eUICC source and MNO-profile source, the profile management system could conclude or predict that that combination is likely to give rise to an operational failure.

In response, the profile management system could then automatically take action to help ensure that when a device has an eUICC from the second source, the MNO profile installed on the device is not from the first source, so as to help avoid an operational failure with that particular combination of eUICC and MNO-profile.

For example, the profile management system could receive from a mobile device of a report of an operational failure such as an authentication failure or installation failure, among other possibilities, and the profile management system could determine that the device's eUICC is from the second source and perhaps further that the device's active MNO profile is from the first source. And in response, the profile management system could select a replacement MNO profile based on the selected MNO profile not being from the first source (perhaps selecting a profile based on it being from the second source as well) and could provide the replacement MNO profile for installation on the device's eUICC in the manner discussed above.

As another example, the profile management system could receive from a mobile device an initial profile request, requesting an MNO profile for installation on the device's eUICC, and the profile request could specify the device's EID. Based on the specified EID, the profile management system could determine that the device's eUICC is from the second source. And to help avoid an operational failure, the profile management system could therefore select for the device an MNO profile that is not from the first source (perhaps selecting a profile based on it being from the second source as well) and could provide the selected MNO profile to the device in response to the device's profile request, for installation on the device's eUICC.

Figure 4:
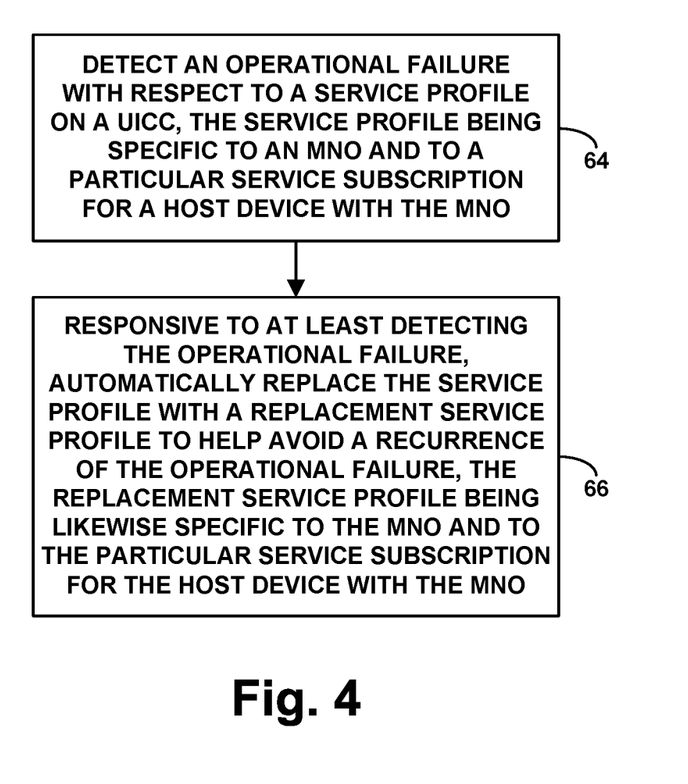
FIG. 4 is a flow chart depicting a method operable in accordance with the disclosure.

FIG. 4 is next a flow chart depicting a method that can be carried out in accordance with the present disclosure to configure a UICC embedded in a host device such as a mobile device as discussed above. This method could be carried out by an MNO's profile management system and/or by one or more other entities.

As shown in FIG. 4, at block 64, the method includes detecting an operational failure with respect to a service profile on the UICC, the service profile being specific to an MNO and to a particular service subscription for the host device with the MNO. And at block 66, the method includes, responsive to at least detecting the operational failure, automatically replacing the service profile with a replacement service profile, the replacement service profile being likewise specific to the MNO and to the particular service subscription for the host device with the MNO. Optimally, replacing the service profile with the replacement service profile may thus help to avoid a recurrence of the detected operational failure.

In line with the discussion above, the operational failure could be an authentication failure, perhaps occurring as a result of a computational error in the UICC executing a security algorithm specified by the service profile. And in that case, the replacement service profile might specify a different security algorithm to be executed by the UICC, to help avoid a recurrence of that computational error.

Alternatively, the operational failure could be a failure to install the service profile on the UICC. For instance, the operational failure could be a failure to install the service profile on the UICC due to the service profile containing at least one unsupported profile policy rule that causes rejection of the service profile, in which case the replacement service profile might not include any unsupported policy profile rule that would cause rejection of the replacement service profile. Or the operational failure could be a failure to install the service profile on the UICC due to insufficient memory on the UICC, in which case the replacement service profile could be smaller than the service profile. For example, the service profile that was too large for installation on the UICC might contain roaming data, and the replacement service profile might not contain the roaming data.

As further discussed above, the act of detecting the operational failure could involve the profile management system receiving a report of the operational failure, in which case replacing the service profile with the replacement service profile could involve the profile management system transmitting to the host device the replacement service profile for installation on the UICC. For instance, the profile management system could both receive the report and transmit the replacement service profile through a WLAN interface with the host device.

Further, the UICC could be a first UICC and a member of a class of UICCs, such as UICCs that are all from the same source. And in that case, the method could additionally involve, based on at least the detecting of the operational failure, (i) setting a profile-selection policy for use with respect to other UICCs of the class of UICCs and (ii) applying the profile-selection policy when selecting a service profile to provision on a second UICC embedded in another host device. For instance, as discussed above, the profile management system could detect that service profiles from a first source are not compatible with UICCs from a second source, and the profile management system could therefore set itself to avoid providing service profiles from the first source for installation on UICCs determined to be from the second source.

Yet further, as discussed above, the act of automatically replacing the service profile with the replacement service profile could involve (i) designating the replacement service profile to be installed on the UICC and (ii) upon receipt of a service-profile request from the host device, transmitting the designated replacement service profile to the host device for installation on the UICC. For instance, the profile management system could personalize an appropriate generic service profile to be for installation on the device's UICC and could provide a code or other directive that results in the device's LPA requesting and downloading that established service profile for installation on the device's UICC.

Figure 5:
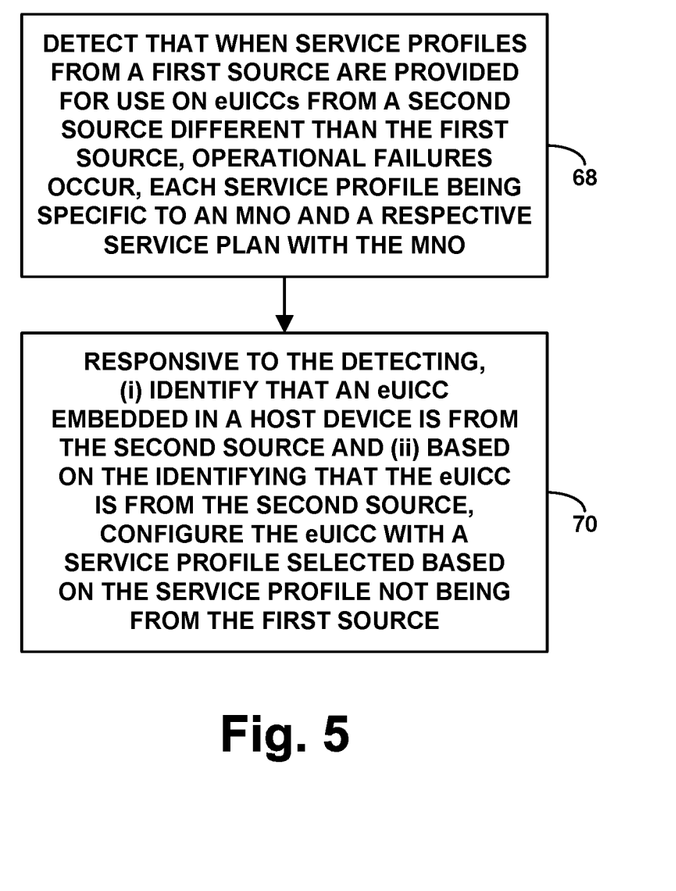
FIG. 5 is another flow chart depicting a method operable in accordance with the disclosure.

FIG. 5 is another flow chart depicting a method that can be carried out in accordance with the present disclosure. This method could likewise be carried out by an MNO's profile management system and/or by one or more other entities.

As shown in FIG. 5, at block 68, the method includes detecting that when service profiles from a first source are provided for use on eUICCs from a second source different than the first source, operational failures occur, where each service profile is specific to an MNO and a respective service plan with the MNO. And at block 70, the method includes, responsive to the detecting, (i) identifying that an eUICC embedded in a host device is from the second source and (ii) based on the identifying that the eUICC is from the second source, configuring the eUICC with a service profile selected based on the service profile not being from the first source, perhaps based on the service profile also being from the second source, and perhaps with the service profile being a replacement service profile.

In line with the discussion above, in this method, the act of detecting that when service profiles from a first source are provided for use on eUICCs from a second source different than the first source, operational failures occur could involve (a) detecting a plurality of the operational failures with respect to service profiles on eUICCs and (b) for each detected operational failure, determining that the service profile is from the first source and the eUICC is from the second source.

Further, as discussed above, the operational failures could include authentication failures and/or profile installation failures, among perhaps other operational failures. As for profile installation failures, for instance, the failures could result from eUICC-misuse of profile-provided data or eUICC non-support of one or more profile elements (e.g., PPRs), among other possibilities.

As additionally discussed above, the act of detecting the operational failures could involve the profile management system receiving reports of the operational failures.

In that case, the act of identifying that the eUICC embedded in the host device is from the second source could involve (i) receiving from the host device a report of at least one of the operational failures, the report including an identifier of the eUICC, and (ii) determining based on the identifier of the eUICC that the eUICC is from the second source. And the act of configuring the eUICC with the service profile selected based on the service profile not being from the first source could involve (i) selecting the service profile based on the service profile not being from the second source and (ii) transmitting the selected service profile to the host device for installation on the eUICC.

Alternatively, the act of identifying that the eUICC embedded in the host device is from the second source could involve (i) receiving from the host device a profile request for a new service subscription, the profile request including an identifier of the eUICC, and (ii) determining based on the identifier of the eUICC that the eUICC is from the second source. And the act of configuring the eUICC with the service profile selected based on the service profile not being from the first source could involve (i) selecting the service profile based on the service profile not being from the first source and (ii) transmitting the selected service profile to the host device in response to the profile request, for installation of the service profile on the eUICC.

Exemplary embodiments have been described above. Those skilled in the art will understand, however, that changes and modifications may be made to these embodiments without departing from the true scope and spirit of the invention.

I claim:

1. A method for configuring a universal integrated circuit card (UICC) embedded in a host device, the method comprising:
   detecting an operational failure with respect to a service profile on the UICC, wherein the service profile is specific to a mobile network operator (MNO) and to a particular service subscription for the host device with the MNO; and
   responsive to at least detecting the operational failure, automatically replacing the service profile with a replacement service profile, wherein the replacement service profile is likewise specific to the MNO and to the particular service subscription for the host device with the MNO, whereby replacing the service profile with the replacement service profile helps to avoid a recurrence of the detected operational failure.

2. The method of claim 1, wherein the operational failure is an authentication failure,
   wherein the authentication failure occurs as a result of a computational error in the UICC executing a security algorithm specified by the service profile, and
   wherein the replacement service profile specifies a different security algorithm to be executed by the UICC.

3. The method of claim 1, wherein the operational failure is a failure to install the service profile on the UICC.

4. The method of claim 3,
   wherein the operational failure is failure to install the service profile on the UICC due to the service profile containing at least one unsupported profile policy rule that causes rejection of the service profile, and
   wherein the replacement service profile does not include any unsupported policy profile rule that would cause rejection of the replacement service profile.

5. The method of claim 3,
   wherein the operational failure is failure to install the service profile on the UICC due to insufficient memory on the UICC, and
   wherein the replacement service profile is smaller than the service profile.

6. The method of claim 5, wherein the service profile contains roaming data, and wherein the replacement service profile does not contain the roaming data.

7. The method of claim 1, implemented by a profile management system of the MNO, wherein detecting the operational failure comprises receiving by the profile management system a report of the operational failure, and wherein replacing the service profile with the replacement service profile comprises transmitting by the profile management system, to the host device, the replacement service profile for installation on the UICC.

8. The method of claim 7, wherein receiving the report and transmitting the replacement service profile occurs through a wireless-local-area-network interface with the host device.

9. The method of claim 1, implemented by a profile management system of the MNO, wherein the UICC is a first UICC, wherein the first UICC is a member of a class of UICCs, the method further comprising:
   based on at least the detecting of the operational failure, (i) setting a profile-selection policy for use with respect to other UICCs of the class of UICCs and (ii) applying the profile-selection policy when selecting a service profile to provision on a second UICC embedded in another host device.

10. The method of claim 9, wherein the class of UICCs is UICCs that are all from a same source.

11. The method of claim 1, wherein automatically replacing the service profile with the replacement service profile comprises (i) designating the replacement service profile to be installed on the UICC and (ii) upon receipt of a service-profile request from the host device, transmitting the designated replacement service profile to the host device for installation on the UICC.

12. A method comprising:
    detecting that when service profiles from a first source are provided for use on embedded universal integrated circuit cards (eUICCs) from a second source different than the first source, operational failures occur, wherein each service profile is specific to a mobile network operator (MNO) and a respective service plan with the MNO; and
    responsive to the detecting, (i) identifying that an eUICC embedded in a host device is from the second source and (ii) based on the identifying that the eUICC is from the second source, configuring the eUICC with a service profile selected based on the service profile not being from the first source.

13. The method of claim 12, wherein the detecting includes:
    detecting a plurality of the operational failures with respect to service profiles on eUICCs; and
    for each detected operational failure, determining that the service profile is from the first source and the eUICC is from the second source.

14. The method of claim 13, wherein the operational failures comprise operational failures selected from the group consisting of authentication failures and profile installation failures.

15. The method of claim 13, wherein at least one of the operational failures results from eUICC-misuse of profile-provided data or eUICC non-support of one or more profile elements.

16. The method of claim 12, wherein configuring the eUICC with a service profile selected based on the service profile not being from the first source comprises configuring the eUICC with a service profile based on the service profile being from the second source.

17. The method of claim 12, implemented by a profile management system of the MNO, wherein detecting the operational failures comprises receiving by the profile management system reports of the operational failures.

18. The method of claim 17,
    wherein identifying that the eUICC embedded in the host device is from the second source comprises (i) receiving from the host device a report of at least one of the operational failures, the report including an identifier of the eUICC, and (ii) determining based on the identifier of the eUICC that the eUICC is from the second source, and
    wherein configuring the eUICC with the service profile selected based on the service profile not being from the first source comprises (i) selecting the service profile based on the service profile not being from the second source and (ii) transmitting the selected service profile to the host device for installation on the eUICC.

19. The method of claim 18, wherein configuring the eUICC with the selected service profile comprises configuring the eUICC with the selected service profile as a replacement service profile.

20. The method of claim 17,
wherein identifying that the eUICC embedded in the host device is from the second source comprises (i) receiving from the host device a profile request for a new service subscription, the profile request including an identifier of the eUICC, and (ii) determining based on the identifier of the eUICC that the eUICC is from the second source, and
wherein configuring the eUICC with the service profile selected based on the service profile not being from the first source comprises (i) selecting the service profile based on the service profile not being from the first source and (ii) transmitting the selected service profile to the host device in response to the profile request, for installation of the service profile on the eUICC.

* * * * *